United States Patent
Hartman

(10) Patent No.: US 6,942,376 B2
(45) Date of Patent: Sep. 13, 2005

(54) EXTRUDER MIXING

(75) Inventor: Steven Hartman, Erin (CA)

(73) Assignee: Industrial Thermo Polymers Limited, Brampton (CA)

( * ) Notice: Subject to any disclaimer, the term of this patent is extended or adjusted under 35 U.S.C. 154(b) by 351 days.

(21) Appl. No.: 10/292,496

(22) Filed: Nov. 13, 2002

(65) Prior Publication Data

US 2004/0089971 A1 May 13, 2004

(51) Int. Cl.⁷ .................................................. B29B 7/46
(52) U.S. Cl. ........................ 366/79; 366/293; 425/204
(58) Field of Search .............................. 356/79, 83, 97, 356/98, 99, 323, 293, 294, 295, 296; 425/208, 204

(56) References Cited

U.S. PATENT DOCUMENTS

| | | | | |
|---|---|---|---|---|
| 3,035,304 A | * | 5/1962 | Reifenhauser | 366/79 |
| 3,175,248 A | * | 3/1965 | Swenson | 366/79 |
| 3,371,379 A | * | 3/1968 | Reifenhauser | 366/79 |
| 3,590,439 A | * | 7/1971 | Swanson | 425/564 |
| 3,606,634 A | * | 9/1971 | Weinert et al. | 366/79 |
| 3,689,182 A | * | 9/1972 | Kovacs | 425/208 |
| 3,924,842 A | * | 12/1975 | Klein et al. | 366/79 |
| 3,999,921 A | * | 12/1976 | Thor et al. | 366/79 |
| 4,164,385 A | * | 8/1979 | Finkensiep | 366/79 |
| 4,290,702 A | * | 9/1981 | Klein et al. | 366/293 |
| 4,365,946 A | * | 12/1982 | Anders | 366/79 |
| 4,387,997 A | * | 6/1983 | Klein et al. | 366/79 |
| 4,472,059 A | * | 9/1984 | Klein et al. | 366/79 |
| 4,637,790 A | * | 1/1987 | Klein | 425/208 |
| 4,802,140 A | * | 1/1989 | Dowling | 366/79 |
| 5,151,282 A | * | 9/1992 | Dray | 425/562 |
| 5,614,227 A | * | 3/1997 | Yarbrough | 366/83 |
| 6,627,134 B2 | * | 9/2003 | Thomson | 366/83 |

* cited by examiner

Primary Examiner—Tony G. Soohoo
(74) Attorney, Agent, or Firm—Eugene J.A. Gierczak

(57) ABSTRACT

An extruder for producing a thermoplastic material having a first and second portion, namely, an axially extending barrel; first and second screw conveyers co-axially disposed within said barrel, said second screw conveyer co-axially disposed within said first screw conveyer with relative rotatable movement between said first and second screw conveyers so as to define a first passage for conveying thermoplastic material from an input to a melt zone and then an output and define a second passage from said melt zone to said output; a connecting passage for communication between said first and second passages whereby a first portion of said thermoplastic melt is conveyed through said first passage to said output and another portion of said thermoplastic melt is conveyed through said connecting passage and through said second passage to said output; means for changing the characteristic of said portion; means for merging said first and second portions together.

15 Claims, 4 Drawing Sheets

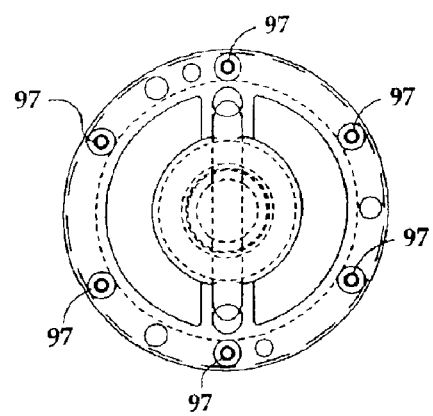
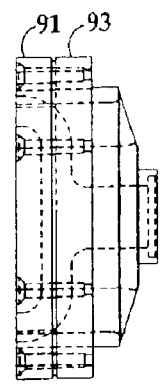
Figure 3.
Figure 4.
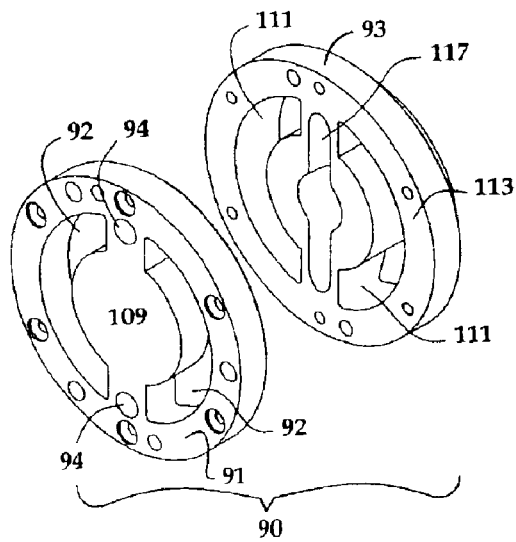
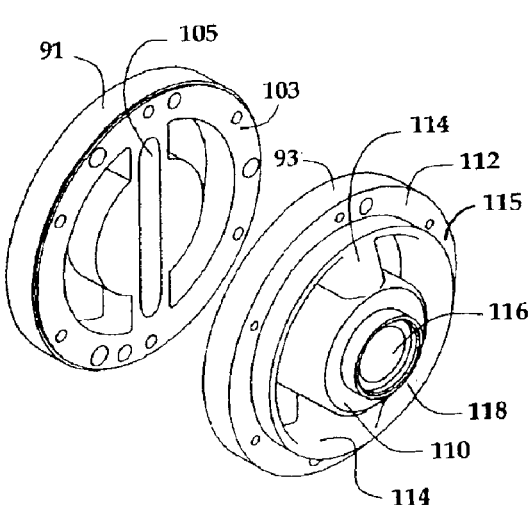
Figure 5.
Figure 6.

EXTRUDER MIXING

FIELD OF INVENTION

This invention relates to an extruder for producing a thermoplastic material having a first and second portion and particularly relates to a method of producing an extruded thermoplastic material having a first and second portion.

BACKGROUND ART

Various devices and methods have heretofore been disclosed which relate to extruders for melting thermoplastic solid materials introduced into an input end, heated in a heated zone and then extruded through an output. A variety of these extruders exist including screw conveyers which are disposed for rotational movement within a barrel. Some of these screw conveyers include a first and second screw conveyer which are co-axially disposed in the barrel where one of said screw conveyers is disposed co-axially within the other screw conveyer.

For example U.S. Pat. No. 3,021,561 discloses two or more screws which run co-axially one within the other where the individual screw members are provided with screw helixes on the internal as well as external surfaces thereof.

Moreover U.S. Pat. No. 3,689,182 illustrates apparatus utilizing a screw type extruder for reducing a solid thermoplastic material to a fluid by maintaining a spiral body of continuous width of the material in a continuous contact with the barrel of the extruder and separating the melted fluid from the solid body by conducting it through radial passageways into a low pressure axially extending region of the extruded screw.

Moreover U.S. Pat. No. 3,924,842 discloses apparatus for preparing a plastic heated material from solids introduced into the apparatus, the apparatus including a barrel having a screw conveyer therein defining a channel for conveying the material downstream as the material is melted within the channel and a passage communicating with the channel at a downstream location and an upstream location, the locations being chosen such that the unmelted solids enter the passage at the downstream location and are carried through the passage in an upstream direction by passing the channel, to be reintroduced into the channel at the upstream location.

Moreover U.S. Pat. No. 4,290,702 relates to plasticating apparatus which operates continuously to plasticate material which is delivered intermittently to a molding device, the plasticating apparatus including a first screw conveyer which rotates in a barrel, a back feed passage within the first screw conveyer and a second screw conveyer in the back feed passage arranged to recirculate material in a circuit extending back through the back feed passage.

Yet another arrangement is shown in U.S. Pat. No. 4,387,997 which illustrates a plasticating extruder in which the screw conveyer includes an inner back feed passage communicating with the channel established by the main flight of the screw conveyer and a solids directing flight for directing unplasticated material into the back feed passage and segregating all ready-plasticated material from the unplasticated material in the channel.

A further arrangement is disclosed in U.S. Pat. No. 4,472,059 which illustrates multiple primary flights and corresponding multiple secondary flights defining multiple channels on the screw conveyer.

Finally U.S. Pat. No. 4,637,790 illustrates plasticating extruders including at least one inner screw conveyer within an outer screw conveyer in a barrel for receiving unmelted solid material from the channel of the outer screw conveyer and conveying the received unmelted solid material in the channel of the inner conveyer in a direction parallel to and axially co-extensive with the direction of travel of the material in the channel of the outer screw conveyer and melting the received unmelted solid material to bring melted material to a downstream location where the melted material from both channels merge to deliver a flow of fully melted material to a downstream discharge outlet. A vent may be located in the barrel in the vicinity where material enters the channel of the inner screw conveyer for improved venting as a result of the diversion of material away from the vent.

Other arrangements are shown on the web site at www.s-par.com.

It is an object of this invention to provide an improved extruder for producing a thermoplastic material having a first and second portion.

It is another object of this invention to provide a method of producing an extruded thermoplastic material having a first and second portion.

DISCLOSURE OF INVENTION

It is an aspect of this invention to provide an extruder for producing a thermoplastic material having a first and second portion, comprising an axially extending barrel; first and second screw conveyers co-axially disposed within said barrel, said second screw conveyer co-axially disposed within said first screw conveyer with relative rotatable movement between said first and second screw conveyers so as to define a first passage for conveying thermoplastic material from an input to a melt zone and then an output and define a second passage from said melt zone to said output; a connecting passage for communication between said first and second passages whereby a first portion of said thermoplastic melt is conveyed through said first passage to said output and another portion of said thermoplastic melt is conveyed through said connecting passage and through said second passage to said output; structure for changing the characteristic of one of said portions; structure for merging said first and second portions together.

It is a further aspect of this invention to provide an extruder for producing a thermoplastic material having a first and second portion comprising an axially extending barrel; a first screw conveyer rotatably extending along said axis of said barrel, comprising a core and an external flight defining a first passage for conveying thermoplastic solid material from an input end to a thermoplastic melt zone and an output end; said first screw conveyer having a bore adjacent said output end and an axially extending passage through said core in said melt zone to said bore; a second screw conveyer fixedly axially disposed within said bore comprising a core and an external flight defining a second passage for communicating with said axially extending passage whereby a first portion of said thermoplastic melt is conveyed through said first passage to said output end and a second portion of said thermoplastic melt is conveyed from said axially extending passage through said second passage to said output end; an aperture disposed through said barrel for adding thermoplastic modifying resin to said first portion of said thermoplastic melt; a plate for merging said first and second portions together.

It is yet another aspect of this invention to provide a method of producing an extruded thermoplastic material having a first and second portion comprising the steps of conveying thermoplastic solids from an input through a first passage defined by a screw conveyer rotatably axially mounted in a barrel, said first passage extending from an input end to a melt zone and then an output end; conveying a portion of said melted thermoplastic material from said melt zone through an axially extending passage through said first screw conveyer to a second screw conveyer axially disposed within said first screw conveyer to said output; adding a modifier or additives (which could be a pigment, dye, elastomer polymer modifier or other or other thermoplastic additive) to said first portion of said thermoplastic melt; merging said portions of thermoplastic at said output.

BRIEF DESCRIPTION OF DRAWINGS

FIG. 3 is a top plan view of the plate.

FIG. 4 is a side elevational view of the plate assembly.

FIG. 5 is a perspective exploded view of the plate assembly taken from one side.

FIG. 6 is a perspective exploded view of the plate assembly taken from another side.

BEST MODE FOR CARRYING OUT THE INVENTION

Figure 1:
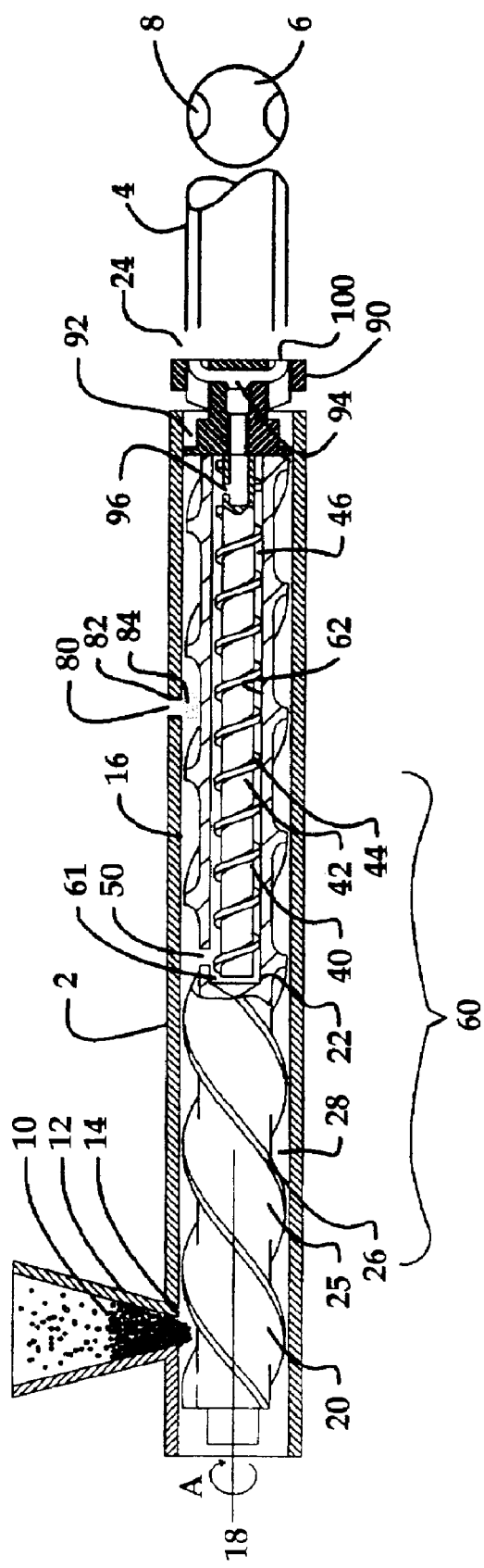
FIG. 1 is a full cross-sectional schematic view of the extruder.

In the description that follows, like parts are marked throughout the specification and the drawings with the same respective reference numerals. The drawings are not necessarily to scale and in some instances proportions may have been exaggerated in order to more clearly depict certain features of the invention.

FIG. 1 generally illustrates the extruder 2 for producing a thermoplastic material or product 4 having first and second portion 6 and 8 respectively, which shall be more fully described herein.

Generally speaking the thermoplastic material starts off as thermoplastic solids 10 which may comprise of pellets or the like that are introduced into a hopper 12 at an input end 14 of the extruder 2. The extruder includes a barrel 16 which extends generally axially along the length of the extruder 2 about an axis 18. The extruder 2 includes a first screw conveyer 20 co-axially disposed inside the barrel 16 along the axis 18. The first screw conveyer 20 has a bore 22 disposed at an output end 24 for receiving a second screw conveyer 40 co-axially disposed within the first screw conveyer 20 about the axis 18.

The first screw conveyer 20 is adapted for relative rotatable movement about the axis 18, and the second screw conveyer 40 is fixed relative to said first screw conveyer 20.

In particular the first screw conveyer 20 comprises a core 25 and an external flight or helical screw 26 for defining a first passage 28 for conveying thermoplastic solid material 10 from the input end 14 to a thermoplastic melt zone 60 disposed between the input 14 and output 24 so as to melt the thermoplastic solid material 10.

The exterior flights 26 of the first screw conveyer 20 are arranged so as to convey the thermoplastic material to the first passage 28 from the input 14 to the melt zone generally illustrated as 60 to the output 24 as the first screw conveyer 20 rotates in a direction A about the axis 18.

The second screw conveyer 40 is fixedly disposed relative to the first screw conveyer 20. The second screw conveyer 40 also includes a core 42 and an external flight or helical thread 44 for defining a second passage 46 when cooperating within the inner wall 62 of bore 22.

The first screw conveyer 20 includes a connecting passage 50 for communication between the first passage 28 and the second passage 46. The second passage 46 extends generally from the connecting passage 50 to the output end 24.

The flights 44 of the second screw conveyer 40 are disposed in a direction so as to convey melted thermoplastic material from an upstream end 61 of second screw conveyer 40 to the output 24, that is the melted thermoplastic will flow in the same direction towards the output 24 in both the first passage 28 and second passage 46.

The connecting passage 50 is disposed generally axially so as to permit communication between the first passage 28 and the second passage 46.

In operation as the first screw conveyer 20 rotates along the axis 18 in a direction A thermoplastic solid material 10 is conveyed along the first passage 28 from the input end 14 through to the melt zone 60 where the thermoplastic solid material 10 is melted as it is being conveyed to the output end 24. A first portion 6 of the melted thermoplastic material continues along the first passage 28 to the output end 24 while a second portion 8 of the thermoplastic melt is directed through the connecting passage 50 into the second passage 46 and conveyed to the output 24.

Since the second screw conveyer 40 is stationary the inner wall 62 of the bore 22 rotates in the direction A thereby providing relative rotational movement therebetween so as to cause the second portion of the thermoplastic melt 10 to be drawn through the connecting passage 50 from the upstream position 60 down through the second passage 46 to the output 24.

The extruder 2 also includes means 80 for changing the characteristic of the first portion 6. The means 80 comprises an aperture 82 which is disposed through the barrel 16 so as permit a user to add thermoplastic modifying material 84 into the first portion 6 of the melted thermoplastic material.

Such means 80 for changing the characteristic of the thermoplastic material can comprise the addition of a substance selected from the group of thermoplastic pigment, dyes, thermoplastic glitter, thermoplastic resin or other thermoplastic modifiers to the first passage. For example the thermoplastic pigment may be added through the aperture 80 which is mixed with the first portion 6 of thermoplastic material so as to change the colour of the first portion 6 relative the second portion 8. Alternatively glitter or other thermoplastic resin may be added thereto so as to change the characteristic of the first portion 6 relative to the second portion 8. Alternatively thermoplastic modifiers could be added to change the properties of the first portion 6 relative the second portion 8.

For example the thermoplastic solid material 10 may comprise of any variety of thermoplastic material which is well known to those persons skilled in the art including polypropylene, ethylene vinyl acetate, metalocene polymers, surlyns, elastomers, styrenics and other thermopathic polymers, as well as polyethylene. Once the thermoplastic material is melted in the melt zone 60 upstream of the aperture 82 in the first passage 28 such melted material would be generally homogeneous. However, once a portion 8 of the material is directed through the second passage 46 pigment may be added to the first portion 6 so that the output produces an extruded thermoplastic material having two colours. Blowing agents may be added to the extruder 2 in a manner well known to those persons skilled in the art so as to produce an expanded extruded profile that may be cut to length.

The output end 24 includes a plate assembly 90 which includes a first plate opening 92 for communication with the first passage 28 and includes a second plate opening 94 for communication with the second passage 46.

More specifically the plate assembly 90 includes a first outer plate 91 and a second inner plate 93. The inner and outer plates 91 and 93 are secured together by a variety of fastening means 95 which can include screws 97.

Outer plate 91 includes an outer surface 99 which defines a first output port or plate opening 92 which communicates with the first passage 28. The output port 92 shown in FIG. 5 consists of two-spaced crescent shaped openings, although any size or shape opening could be used.

The inner surface 103 of outer plate 91 includes a central passage 105 which leads to second output port 94 which as shown consist of second plate opening 94 which in one embodiment as shown consists of two-spaced output holes 94. The second output means 94 communicates with second passage 46 in a manner to be more fully described herein.

The outer surface 99 of outer plate 91 includes a central solid portion 109.

The inner plate 93 includes an output port 111 that communicates with output port 92 as well as the first passage 28.

More specifically the output port 111 consists of two-spaced crescent shaped opening which are co-extensive with the crescent shaped openings 92 of out plate 91.

The inner plate 93 has an outer surface 113 and an inner surface 115. The inner plate 93 as shown in FIG. 6 defines a central hub section 110 having an outer ring 112 joined together by a pair of spaced radially extending rib portions 114 which define the two crescent shaped output ports 111.

The hub portion 110 includes a centrally located bore 116 which extends from inner surface 115 to extend into a radially extending slot 117 that co-extensively communicates with central passage 105 and then output ports 94.

The bore 116 can have fastening means 118 such as internal threads for example to fasten the plate assembly to the second screw conveyer 40. However, other fastening means can be used such as welding or the like.

The plate assembly 90 defines the first output port or plate opening 92 as shown in FIG. 5 as well as the second plate opening 94.

Once assembled together plates 91 and 93 are flush with one another preventing seepage of any material between the joints.

Figure 2:
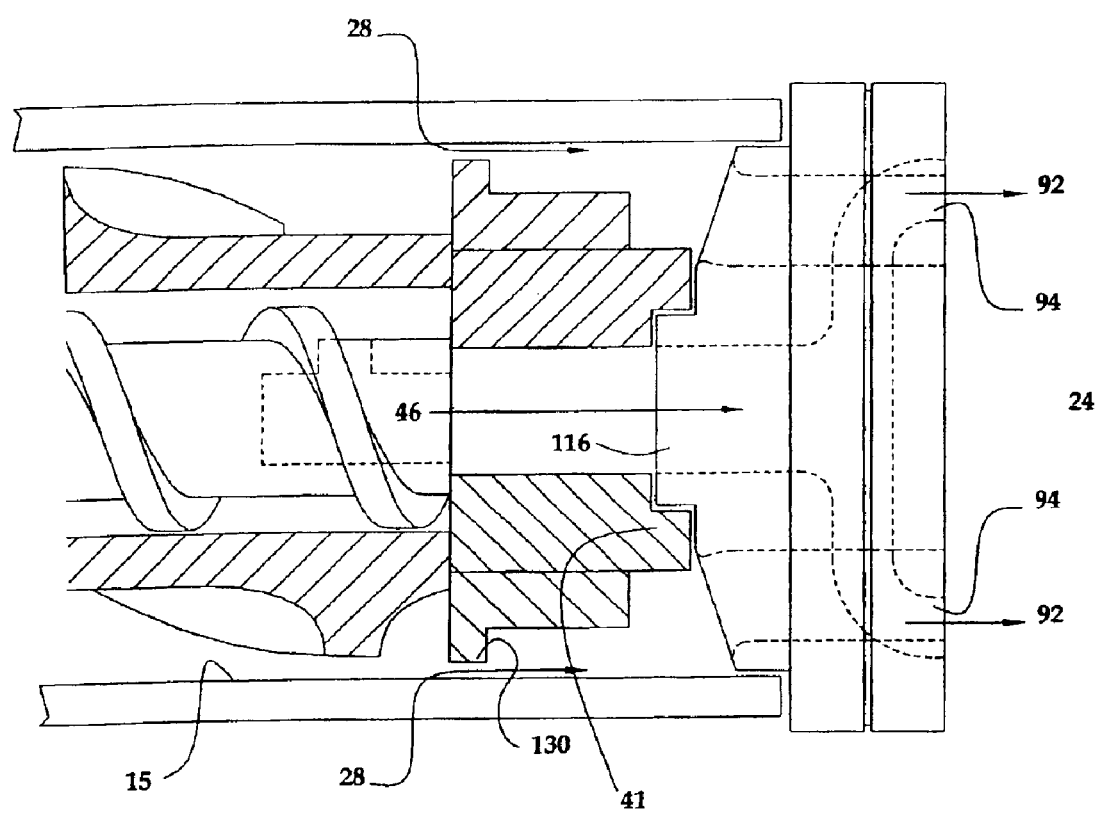
FIG. 2 is a partial cross-sectional view of the second screw conveyer at the output with the plate.

As best seen in FIG. 2 the output end 24 includes plate-anchoring means 130 which are connected to the barrel 16. More specifically, the plate assembly 90 is connected to the plate anchoring means 130 which in turn is connected to anchoring means 41. Moreover, one end of the second screw conveyer is connected to anchoring means 41. The plate assembly is clamped between the barrel 16 and ultimate tooling (not shown) by means of a clamp. In other words, the plate assembly 90 is clamped to the barrel 16. In one embodiment the plate assembly 90 is clamped to the barrel 16 and is stationary relative the barrel, as well as having the second screw conveyer anchoring means 41 and plate assembly means and the second screw conveyor 40 stationary relative the barrel 16. First screw conveyer 20 however rotates relative the second screw conveyer 40. FIG. 2 shows a space between the end of the barrel 16 and second inner plate 93 for clarity, but in operation this space is either sealed or there is no space for leakage of the first portion 6 between the end of the barrel 16 and inner plate 93. Moreover, the plate anchoring means 130 is firmly connected to the plate assembly so as to permit the first portion 6 to freely pass through first passage 28 as shown in FIG. 2.

Figure 8:
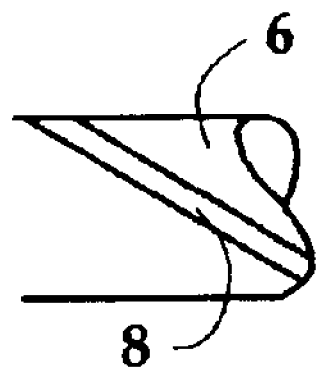
FIG. 8 is yet another embodiment of the extruded thermoplastic material.

Alternatively, as shown in FIG. 8 the plate assembly may be rotated relative barrel 16 so as to produce a spiral design in which case the plate anchoring means 130, anchoring means 41 and second screw conveyer 40 rotates with the plate assembly since they are anchored to it.

The output end 24 also includes second screw conveyer anchoring means 41.

The second screw conveyer 40 includes an aperture 96 therethrough for communication with the second plate opening 94.

Moreover the plate 90 includes an adjusting means 100 for adjusting the ratio between the first and second portions 6 and 8. One such adjusting means consists of disassembling the first outer plate 91 by unscrewing the alien screws 97 and change the outer plate 91 with a different outer plate 91 having a smaller or larger second plate opening 94 relative to the size of the first plate opening 92.

In this fashion the extruder 2 can be operated so as to produce a substantially continuous extruded material which generally exits the output 24 as a profile portion having a first 6 and a second 8 portion.

Figure 10:
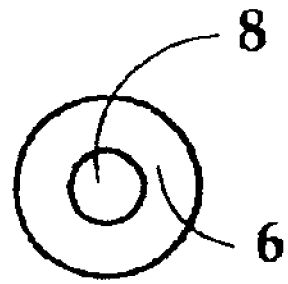
FIG. 10 is another embodiment of the invention

FIG. 10 illustrates one embodiment of the extruded material which generally illustrates the cross-sectional area of the material exiting the output 24 and includes the first portion 6 and a second portion 8 which are concentrically disposed one within the other. In other words, the outside surface of the extruded material may be one colour 6 while the inner portion of the extruded material 8 may be another colour. Furthermore the output end 24 may be arranged in a manner well known to those persons skilled in the art so that the second portion 8 may also include a design such as a star or the like.

Figure 7A:
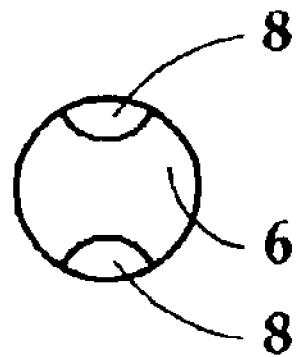
FIGS. 7a and 7b show different embodiments of the extruded thermoplastic material.
Figure 7B:
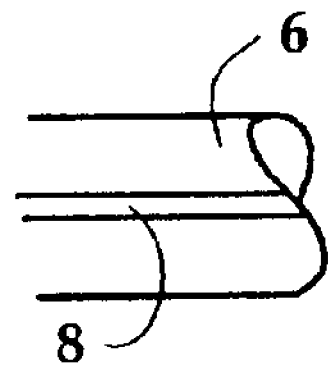

Furthermore FIGS. 7a and 7b illustrate yet another embodiment of the invention whereby the extruded material exiting the output 24 may include as shown in cross-section of FIG. 7a first portion 6 and a second portion 8 along the length thereof. As shown in FIGS. 7a and 7b the second portion may be adjusted by the adjusting means 100 so that the cross-sectional area of second portion 8 may be enlarged. It should be noted that as the first and second portions 6 and 8 exit output 24 the thermoplastic material is still hot enough that the first and second portions 6 and 8 blend and fuse together to produce a generally cylindrical extrusion as shown.

Figure 9:
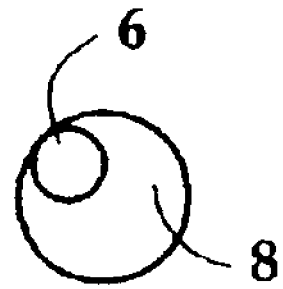
FIG. 9 is another embodiment of the extruded thermoplastic material.

FIG. 9 also illustrates another embodiment of the invention.

The temperature of the extruder may be operated in a manner well known to those persons skilled in the art and in one example the hopper temperature may be operated at 105° C. while the heating zone 60 is operated at 160° C. and the output 24 operated at approximately 80° C. These temperatures, however, are given by way of example only and should not be limited to the invention described herein as other operating temperatures may be utilized depending on the thermoplastic material utilized.

Various embodiments of the invention have now been described in detail.

Since changes in and/or additions to the above-described best mode may be made without departing from the nature, spirit or scope of the invention, the invention is not to be limited to said details.

I claim:

1. An extruder for producing a thermoplastic material having a first and second portion, namely:
   (a) an axially extending barrel;
   (b) first and second screw conveyers co-axially disposed within said barrel, said second screw conveyer co-axially disposed within said first screw conveyer with relative rotatable movement between said first and second screw conveyers so as to define a first passage for conveying thermoplastic material from an input to a melt zone and then an output and define a second passage from said melt zone to said output;
   (c) a connecting passage for communication between said first and second passages whereby a first portion of said thermoplastic melt is conveyed through said first passage to said output and another portion of said thermoplastic melt is conveyed through said connecting passage to said second passage;
   (d) said second screw conveyor including an aperture for communication of said another portion of said thermo plastic melt from said second passage to said output;
   (e) means for merging said first and second portions together.

2. An extruder as claimed in claim 1 wherein said first screw conveyer is mounted for rotational axial movement within said barrel and said second screw conveyer is fixed relative to said first screw conveyer.

3. An extruder as claimed in claim 2 further including an inlet through said barrel for adding a substance selected from the group of thermoplastic pigment, dyes, elastomers, thermoplastic glitter, thermoplastic resin, thermoplastic modifiers so as to change the characteristics of said first portion of thermoplastic melt.

4. An extruder as claimed in claim 3 wherein said substance comprises a pigment for producing thermoplastic material having a first coloured portion and a second coloured portion.

5. An extruder as claimed in claim 1 further including a plate disposed at said output for merging said first and second coloured portions together.

6. An extruder for producing a thermoplastic material having a first and second portion, namely:
   (a) an axially extending barrel;
   (b) first and second screw conveyers co-axially disposed within said barrel, said second conveyer co-axially disposed within said first screw conveyer with relative rotatable movement between said first and second screw conveyers so as to define a first passage for conveying thermoplastic material from an input to a melt zone and then an output and define second passage from said melt zone to said output wherein said first screw conveyer is mounted for rotational axial movement within said barrel and said second screw conveyer is fixed relative to said first screw conveyer;
   (c) a connecting passage for communication between said first and second passage whereby a first portion of said thermoplastic melt is conveyed through said first passage to said output and another portion of said thermoplastic melt is conveyed through said connecting passage to said second passage;
   (d) means for changing the characteristic of said first portion of thermoplastic melt comprising an inlet through said barrel for adding a pigment for producing thermoplastic material having a first coloured portion and a second coloured portion;
   (e) a plate disposed at said output for merging said first and second coloured portions together
   wherein said second screw conveyer includes an aperture through said second screw conveyor in the vicinity of said output and communicates with said plate.

7. An extruder as claimed in claim 6 wherein said first passage communicates with said plate.

8. An extruder as claimed in claim 7 wherein said plate includes means to slow down the speed of one portion of said material relative said second portion.

9. An extruder as claimed in claim 8 wherein said extruder includes means for introducing a blowing or foaming agent into said extruder.

10. An extruder as claimed in claim 9 wherein said inlet is disposed between said connecting passage and output.

11. An extruder for producing a thermoplastic material having a first and second portion comprising:
    (a) an axially extending barrel;
    (b) a first screw conveyer rotatably extending along said axis of said barrel, comprising a core and an external flight defining a first passage for conveying thermoplastic solid material from an input end to a thermoplastic melt zone and an output end;
    (c) said first screw conveyer having:
        (i) a bore adjacent said output end;
        (ii) axially extending passage through said core in said melt zone to said bore
    (d) a second screw conveyer fixedly axially disposed within said bore comprising a core and an external flight defining a second passage for communicating with said axially extending passage whereby a first portion of said thermoplastic melt is conveyed through said first passage to said output end and a second portion of said thermoplastic melt is conveyed from said axially extending passage through said second passage to said output end;
    (e) an aperture disposed through said barrel downstream of said axially extending passage for adding thermoplastic modifying resin to said first portion of said thermoplastic melt;
    (f) a plate for merging said first and second portions together.

12. An extruder as claimed in claim 11 wherein said plate includes a first plate opening for communication with said first passage and a second plate opening for communication with said second passage.

13. An extruder for producing a thermoplastic material having a first and second portion comprising:
    (a) an axially extending barrel;
    (b) a first screw conveyor rotatably extending along said axis of said barrel, comprising a core and an external frlight defining a first passage for conveying thermoplastic solid material from an input end to a thermoplastic melt zone and an output end;
    (c) said first screw conveyor having:
        (i) a bore adjacent said output end;
        (ii) axially extending passage through said core in said melt zone to said bore;
    (d) a second screw conveyor fixedly axially disposed within said bore comprising a bore and an external flight defining a second passage for communicating with said axially extending passage whereby a first portion of said thermoplastic melt is conveyed through said first passage to said output end and a second portion of said thermoplastic melt is conveyed from said axially extending passage through said second passage to said output end;

(e) aperture disposed through said barrel for adding thermoplastic modifying resin to said first portion of said thermoplastic melt;

(f) a plate for merging said first and second portions together; wherein said plate includes a first plate opening for communication with said first passage and a second plate opening for communication with said second passage; and wherein said second screw conveyor includes an aperture there through for communication with said second plate opening.

14. An extruder as claimed in claim 13 wherein said plate includes adjusting means for adjusting the ratio between said first and second portions.

15. An aperture as claimed in claim 14 wherein said plate is rotatable to produce a spiral first and second portion.

* * * * *